United States Patent [19]

Akatsu

[11] Patent Number: 4,632,556
[45] Date of Patent: Dec. 30, 1986

[54] METHOD AND APPARATUS FOR OPTICALLY MEASURING CLEARANCE CHANGE

[75] Inventor: Toshio Akatsu, Ibaraki, Japan

[73] Assignee: Hitachi, Ltd., Tokyo, Japan

[21] Appl. No.: 540,157

[22] Filed: Oct. 7, 1983

[30] Foreign Application Priority Data

Oct. 22, 1982 [JP] Japan .............................. 57-184526

[51] Int. Cl.$^4$ .............................................. G01B 9/02
[52] U.S. Cl. ..................................... 356/351; 356/359
[58] Field of Search ........ 356/351, 359, 349, 354–358; 350/356

[56] References Cited

U.S. PATENT DOCUMENTS

| | | | |
|---|---|---|---|
| 3,632,214 | 1/1972 | Chang et al. | 356/351 |
| 3,796,495 | 3/1974 | Laub | 356/359 X |
| 4,180,328 | 12/1979 | Drain | 356/351 X |
| 4,196,977 | 4/1980 | Scibor-Rylski | 350/356 |
| 4,298,283 | 11/1981 | Makosch et al. | 356/351 |
| 4,358,201 | 11/1982 | Makosch | 356/351 |

FOREIGN PATENT DOCUMENTS 56-103303 8/1981 Japan .

Primary Examiner—Davis L. Willis
Attorney, Agent, or Firm—Antonelli, Terry & Wands

[57] ABSTRACT

A clearance formed between two members is measured by optical means projecting a light beam on the respective members and utilizing lights reflected therefrom.

The reflected lights from the two members are passed through means capable of regulating an optical length and polarization means, whereupon they are caused to interfere. The irradiance of the interference light is converted into an electric signal. The electric signal is applied to a control circuit, and is fed back to the means capable of regulating an optical length so that the optical-path difference of the reflected lights may be held constant. The change of the clearance between the two members is found by measuring the factor of the feedback.

9 Claims, 7 Drawing Figures

METHOD AND APPARATUS FOR OPTICALLY MEASURING CLEARANCE CHANGE

BACKGROUND OF THE INVENTION

1. Field of the Invention

The present invention relates to a measuring method and measuring apparatus wherein a clearance change formed between two members is measured by projecting a light beam on the two members and by utilizing optical interference induced by reflected lights from the respective members.

2. Description of the Prior Art

The measurement of the clearance, especially minute clearance, between two objects utilizing optical interference is applied to, for example, a case of measuring the change of the minute clearance between a slider and a disk in a magnetic disk apparatus. Examples of such prior arts are disclosed in the specification of U.S. Pat. No. 4,298,283 and the official gazette of Japanese Laid-open Patent Application No. 56-103303. The measuring method disclosed in the latter is such that a light beam is projected on two members, that a regulator capable of varying the optical distance of an optical path, such as an electrostriction transducer, is installed midway of the optical path of either of reflected lights from the two members, that the irradiance of interference light based on the optical-path difference of the reflected lights from the two members is detected, that the regulator is controlled with the detected signal so as to minimize or maximize the irradiance of the interference light at all times, and that the clearance change between the two members is measured from the controlled variable of the regulator.

The measuring method, however, has the following disadvantages:

(1) An optical system is complicated.

(2) In order to make the optical distance variable, a mirror or the like optical component disposed in the optical path needs to be displaced at high speed. In this regard, the regulator such as the electrostriction transducer for varying the optical distance has its mechanical resonance point determined by the geometry of the transducer. In order to raise the resonance point, the geometry of the transducer may be made small. However, the small-sized transducer exhibits a small displacement with respect to an applied voltage. For this reason, the geometry of the transducer cannot be made very small, and the resonance point cannot be made high. In consequence, when the varying speed of the clearance is high, the measurement becomes difficult.

SUMMARY OF THE INVENTION

An object of the present invention is to eliminate the disadvantages described above, and to provide a method and apparatus for measuring a clearance change in which an optical system is simplified and which can satisfactorily respond even to a clearance change at high speed by removing any mechanical moving part from an optical-path regulator.

The characterizing feature of the present invention is as stated below. A light beam is projected on two members, and reflected lights from the two members are caused to interfere after passing them through polarization means as well as optical-path regulation means equipped with an element whose refractive index varies depending upon a voltage. The irradiance of interference light which is determined by an optical-path difference is converted into an electric signal, which is fed back to the optical-path regulation means via a control circuit. The control circuit controls the feedback factor so that the optical-path difference may be always held constant even when the clearance between the two members has changed, and the clearance change of the two members is optically measured from the controlled variable.

DESCRIPTION OF THE PREFERRED EMBODIMENTS

Figure 1:
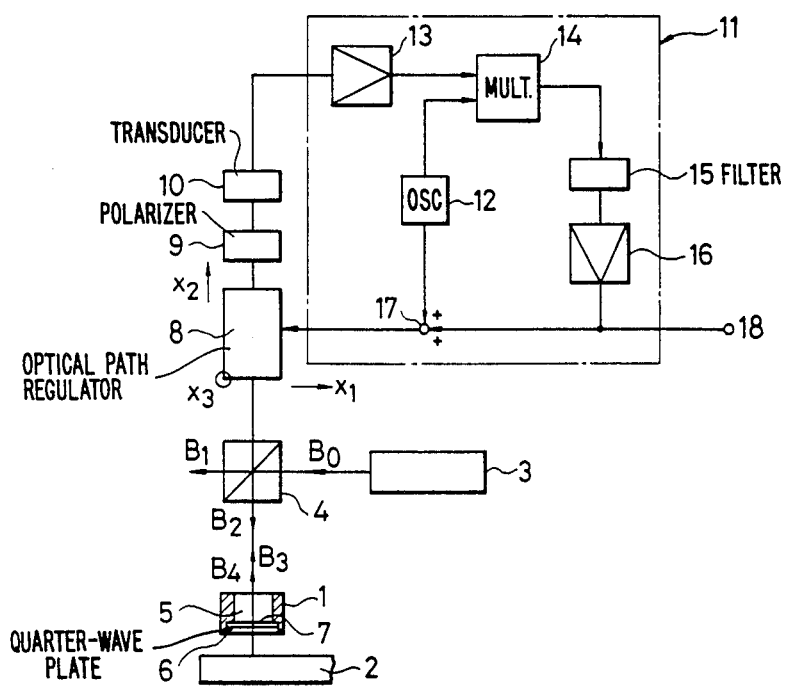
FIG. 1 is a block diagram for explaining an embodiment of the present invention.

FIG. 1 is a diagram for explaining an example of the optical measurement of a clearance in the present invention, as to a case of measuring the change of the minute clearance between a slider 1 and a disk 2 in a magnetic disk apparatus.

A light source 3 is a laser oscillator by way of example. It generates a linearly polarized laser beam $B_0$ of wavelength $\lambda$ having, for example, a polarization plane parallel to the sheet of the drawing. The laser beam $B_0$ is split into beams $B_1$ and $B_2$ by a beam splitter 4. Here, the beam $B_1$ is not pertinent to the operation of the present invention. The slider 1 is provided with an aperture 5. A quarter-wave plate 6 is bonded on that side of the slider 1 which is closer to the disk 2. The quarter-wave plate 6 is such that, when light passing therethrough has reciprocated once, the polarization plane of the light changes by 90 degrees, and its front surface is coated with a reflective film 7. Part of the laser beam $B_2$ is reflected by the reflective film 7 and becomes reflected light $B_3$, which returns in the direction of the incident light. The remaining part of the laser beam $B_2$ is transmitted through the quater-wave plate 6 and is reflected by the disk 2 into reflected light $B_4$, which similarly returns in the direction of the incident light. The reflected lights $B_3$ and $B_4$ are transmitted through the beam splitter 4, and enter an optical-path regulator 8. The optical-path regulator 8 is constructed of a crystal member having the Pockels effect, and has an output voltage applied thereto from a control circuit 11 to be described later.

Figure 2:
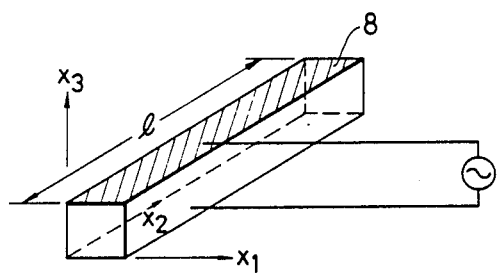
FIG. 2 is a diagram for explaining the electrooptic crystal member of an optical-path regulator in FIG. 1.

FIG. 2 is a diagram for explaining the crystal member which has the Pockels effect. Here, the function of the crystal member will be described by taking lithium niobate ($LiNbO_3$) as an example. Linearly polarized light which has a polarization plane parallel to a plane formed by an $x_1$-axis and an $x_2$-axis is caused to enter the crystal member in the direction of the $x_2$-axis, and an electric field E is applied in the direction of an $x_3$-axis. Then, a refractive index $n_o'$ for the light is indicated by the following equation:

$$n_o' = n_o - \tfrac{1}{2}n_o^3 r_{13} E \tag{1}$$

where $n_o$: refractive index at the null electric field, $r_{13}$: constant.

On the other hand, a refractive index $n_e'$ for linearly polarized light which has a polarization plane parallel to a plane formed by the $x_2$-axis and the $x_3$-axis is indicated by the following equation:

$$n_e' = n_e - \tfrac{1}{2} n_e^3 r_{33} E \tag{2}$$

where $n_e$: refractive index at the null electric field, $r_{33}$: constant.

As indicated by Equation (1) or (2), the refractive index of the crystal member decreases with rise in a voltage and increases with lowering in the same.

Now, let's consider a case where the optical-path regulator 8 has its $x_1$- and $x_2$-axes arranged in parallel with the sheet of the drawing as illustrated in FIG. 1. Since the polarization plane of the reflected light $B_3$ is parallel to the sheet of the drawing, Equation (1) is applicable to the refractive index in this case. Accordingly, letting $l$ denote the length of the optical-path regulator 8, the equivalent optical length $l_{10}$ of the optical-path regulator 8 for the reflected light $B_3$ is indicated by Equation (3):

$$l_{10} = l \cdot n_o' = (n_o - \tfrac{1}{2} n_o^3 r_{13} E) l \tag{3}$$

On the other hand, the reflected light $B_4$ has reciprocated through the quarter-wave plate 6 once. Therefore, it differs in the polarization plane by 90 degrees with respect to the reflected light $B_3$ and becomes parallel to the plane formed by the $x_2$- and $x_3$-axes. Since Equation (2) is applicable to the refractive index of the optical-path regulator 8 for the light $B_4$, the equivalent optical length $l_{11}$ in this case is indicated by Equation (4):

$$l_{11} = l \cdot n_e' = (n_e - \tfrac{1}{2} n_e^3 r_{33} E) l \tag{4}$$

As indicated by Equation (3) or (4), the equivalent optical length of the optical-path regulator 8 decreases with rise in the voltage and increases with lowering in the same.

In the next place, letting $\Delta l$ denote an optical-path difference in the course in which the reflected lights $B_3$ and $B_4$ resulting respectively from the reflections of the incident light $B_2$ by the reflective film 7 and the disk 2 are transmitted through the optical-path regulator 8, it is indicated by Equation (5):

$$\Delta l = 2(t \cdot n_{\lambda/4} + h) + l_{11} - l_{10} \tag{5}$$

$$= 2(t \cdot n_{\lambda/4} + h) + (n_e - \tfrac{1}{2} n_e^3 r_{33} E - n_o + \tfrac{1}{2} n_o^3 r_{13} E) l$$

where t: thickness of the quarter-wave plate 6, $n_{\lambda/4}$: refractive index of the quarter-wave plate 6, h: clearance formed between the slider 1 and the disk 2.

Here, the clearance h is indicated by Equation (6):

$$h = H + h(t) \tag{6}$$

where

H: mean clearance, h(t): clearance which fluctuates with time.

When Equation (6) is substituted into Equation (5), the following equation is obtained:

$$\Delta l = 2\{t(n_{\lambda/4}) + H\} + 2 h(t) + (n_e - n_o) l - \tfrac{1}{2} E(n_e^3 r_{33} - n_o^3 r_{13}) l \tag{7}$$

The optical-path difference in the course in which the reflected lights $B_3$ and $B_4$ resulting from the incident light $B_2$ are transmitted through the optical-path regulator 8 is indicated by Equation (7). Since the reflected lights $B_3$ and $B_4$ have the polarization planes differing by 90 degrees, they do not interfere at positions where they have been transmitted through the optical-path regulator 8. However, when a polarizer plate 9 is placed with the axis of the transmission set at an angle $\theta$ to the $x_1$-axis, the reflected lights $B_3$ and $B_4$ interfere.

Figure 3:
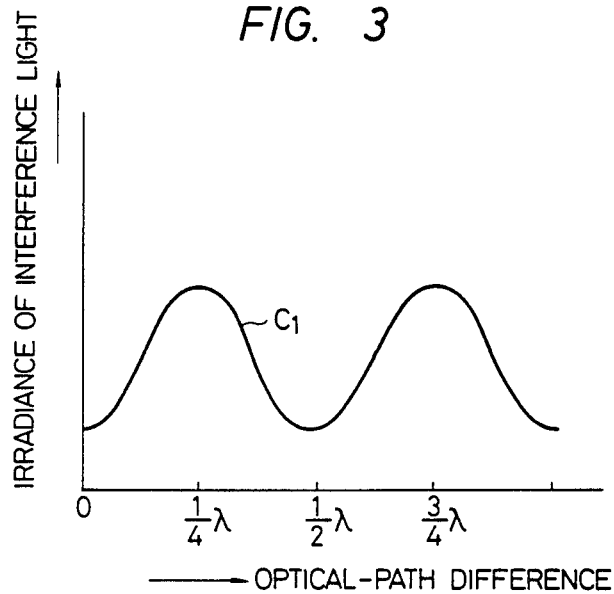
FIG. 3 is a graph showing the relationship between the optical-path difference and the irradiance of interference light in the present invention.

The relationship between the optical-path difference of the reflected lights $B_3$, $B_4$ and the irradiance of the interference light becomes as shown by a curve $C_1$ in FIG. 3. The irradiance of the interference light which is determined by the optical-path difference is converted into an electric signal by a photoelectric transducer 10. The electric signal from the photoelectric transducer 10 is fed back to the optical-path regulator 8 via the control circuit 11 so that the optical-path difference may be held constant at all times. Thus, the change of the clearance can be measured from the factor of the feedback to the optical-path regulator 8.

An example of the practicable arrangement of the control circuit 11 is as shown in FIG. 1. The control circuit 11 is composed of a radio frequency oscillator 12 which produces voltages corresponding to the optical-path differences $\pm \Delta l$ of the reflected lights $B_3$, $B_4$, an amplifier 13 which amplifies the electric signal from the photoelectric transducer 10, a multiplier 14 which calculates the product between the output voltage of the radio frequency oscillator 12 and that of the amplifier 13, a low-pass filter 15 which removes a high frequency component from the output voltage of the multiplier 14, an amplifier 16 which has a sufficiently great gain, and an adder 17 which adds the output voltage of the radio frequency oscillator 12 and that of the amplifier 16 so as to feed the sum back to the optical-path regulator 8.

Now, an example of the operation of the control circuit 11 will be described. It is supposed that the optical-path difference of the reflected lights $B_3$, $B_4$ at a certain instant correspond to a point a on a curve $C_2$ shown in FIG. 4.

Figure 5:
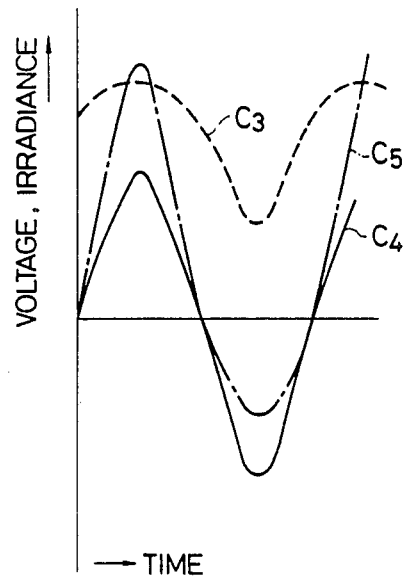
Figure 6:
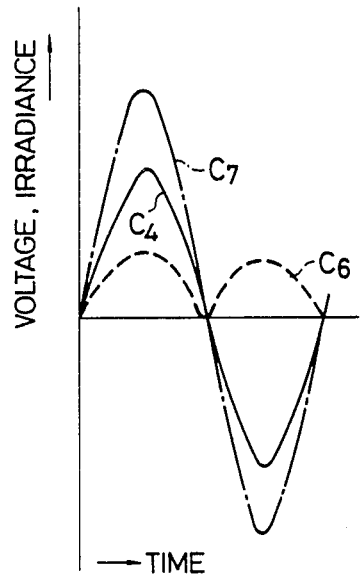

Under this state, the radio frequency voltages generated by the radio frequency oscillator 12 and corresponding to, e.g., $\pm \Delta l$ in terms of the optical-path difference of the reflected lights $B_3$, $B_4$ and the output voltage from the amplifier 16 are added by the adder 17, whereupon the sums are applied to the optical-path regulator 8. Thus, the refractive index of the crystal member constituting the optical-path regulator 8 changes, the optical lengths of the reflected lights $B_3$, $B_4$ change, and the optical-path difference of the reflected lights $B_3$, $B_4$ changes by $\pm \Delta l$. The time variation of the irradiance of the interference light based on the change of the optical-path difference is as shown by a curve $C_3$ of dotted line in FIG. 5. The variation of the irradiance of the interference light as shown by the curve $C_3$ is converted into the electric signal by the photoelectric transducer 10 shown in FIG. 1 and then amplified by the amplifier 13. The amplified signal is supplied to the multiplier 14. In this multiplier 14, the product between the output voltage of the amplifier 13 and the radio frequency voltage (curve $C_4$ indicated by a solid line in FIG. 5 or 6) generated by the radio frequency oscillator 12 is calculated, to produce an output signal asymmetric in plus and minus values as shown by a curve $C_5$ of dot-and-dash line in FIG. 5. The low frequency component of this output signal is taken out by the low-pass filter 15. Thus, the low-pass filter 15 generates a positive voltage.

Figure 4:
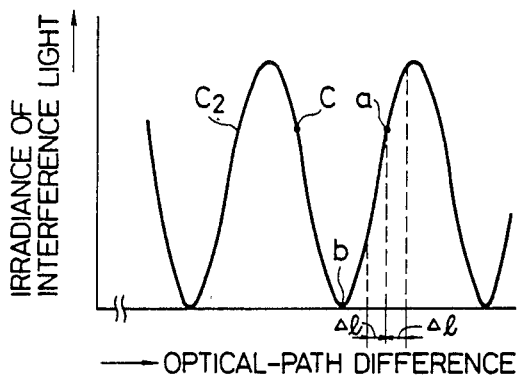
FIGS. 4 to 7 are graphs for explaining an example of a control circuit in the present invention.
Figure 7:
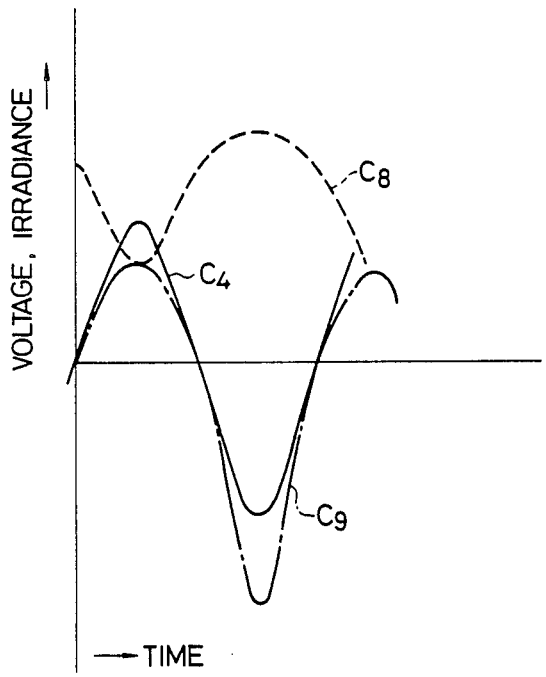

It is now supposed that the optical-path difference of the reflected lights $B_3$, $B_4$ at a certain instant correspond to a point b or point c on the curve $C_2$ shown in FIG. 4. When, under this state, the apparatus is operated similarly to the above, the optical lengths of the reflected lights $B_3$, $B_4$ change, and the time variation of the irradiance of the interference light based on the change of the optical-path difference becomes as shown by a curve $C_6$ or $C_8$ of dotted line in FIG. 6 or FIG. 7. The variation of the irradiance of the interference light as shown by the curve $C_6$ or $C_8$ is converted into the electric signal by the photoelectric transducer 10 shown in FIG. 1, whereupon the signal is processed similarly to the foregoing. Thus, the output of the multiplier 14 becomes as shown by a curve $C_7$ or $C_9$ of dot-and-dash line in FIG. 6 or FIG. 7, and the output of the low-pass filter 15 becomes null or a minus voltage. Accordingly, when the output of the low-pass filter 15 is amplified by the amplifier 16 having the sufficiently high gain and then fed back to the optical-path regulator 8, the optical-path difference changes and balances at the point b on the curve $C_2$ shown in FIG. 4.

Therefore, when the relationship between the applied voltage of the optical-path regulator 8 and the optical-path difference is calibrated in advance, the change of the clearance between the two members can be found by measuring the output voltage of the amplifier 16 through a terminal 18. Here, when the output voltage of the radio frequency oscillator 12 is changed from the aforementioned voltage corresponding to $\Delta l$ into a voltage corresponding to $\lambda/4$, the output voltage of the low-pass filter 15 to be generated at the deviation of the optical-path difference from the balance point can be maximized.

According to the measuring method and apparatus of the present invention, the optical system becomes very simple, and the optical-path regulator includes no moving part, so that a clearance change at high speed can be measured. In addition, the reflected lights $B_3$ and $B_4$ pass nearly the same optical path, and only the clearance formed between the two members to be measured differs for the reflected lights, so that the interference light is stabilized. Moreover, when the output voltage of the radio frequency oscillator is set at a voltage corresponding to $\lambda/4$, the output voltage of the low-pass filter becomes the greatest to enhance the measurement accuracy. Besides, since the clearance can be measured irrespective of the wavelength of the laser beam, the data processing becomes simple. Further, the measuring range is not restricted by the wavelength of the light source.

As set forth above, according to the present invention, the optical system is simplified, and even the clearance change at high speed can be satisfactorily responded to.

I claim:

1. A method of optically measuring a change in a clearance formed between two members by radiating a light beam onto the two members and utilizing light reflected from the two members, the method comprising the steps of: attaching an optical element for changing the plane of polarization of light to one of the two members; irradiating the other member with coherent linearly polarized light through the optical element; obtaining a light beam reflected from the optical element; obtaining a light beam reflected from the other member and passed through the optical element and having a plane of polarization normal to the plane of polarization of the light beam reflected from the optical element; passing the two reflected light beams through optical-path regulation means including an electrooptical crystal member having a variable refractive index which varies in dependence upon an applied voltage, and polarizing means; applying a radio-frequency voltage to the optical-path regulation means; causing the two reflected light beams to interfere with each other; converting the intensity of the interference light to an electric signal; feeding a voltage signal generated in response to the electrical signal back to the optical-path regulation means through a control circuit so that a difference between the optical paths of the two reflected light beams is maintained constant, the control circuit including a first circuit for generating an output voltage which compensates for a change of the difference between the optical paths of the two reflected light beams in accordance with the electrical signal and the radio-frequency voltage, a second circuit for generating the radio-frequency voltage, and an adder for adding the output voltage of the first circuit and the radio-frequency voltage of the second circuit for providing the voltage signal to be applied to the optical-path regulation means; and measuring the change in the clearance between the two members from the output voltage of the first circuit.

2. A method of optically measuring a clearance change as defined in claim 1, wherein said control circuit calculates a product between the electric signal applied thereto and a radio frequency voltage, removes a high frequency component from the calculated voltage to provide only a low frequency component voltage, adds the resulting low frequency voltage and the radio frequency voltage and applies the added voltage to said optical-path regulation means, whereby the clearance change between the two members is measured from the low frequency voltage.

3. A method of optically measuring a clearance change as defined in claim 2, wherein the radio frequency voltage is each of voltages which correspond to $\pm\lambda/4$ in terms of an optical-path difference between the reflected lights from the two members.

4. An apparatus for optically measuring a change in a clearance formed between two members by radiating a light beam from a light source onto the two members and utilizing light beams reflected from the two members, the apparatus comprising: a beam splitter for directing the light beam from the light source to the two members; an optical element being attached to one of the two members for changing the plane of polarization of light passing therethrough; optical-path regulation means including an electrooptical crystal member disposed in a path of the reflected light beams and having a variable refractive index which varies in dependence upon an applied voltage; polarizing means for causing the reflected light beams coming from the two members and passing through the optical-path regulation means to interfere with each other; photoelectric transducer means for converting the intensity of the interference light having passed through the polarizing means to an electric signal for generating a voltage signal to be fed back to the optical-path regulation means so that the difference between the optical paths of the two reflected light beams is maintained constant, the control circuit means including a radio-frequency oscillator for generating a radio-frequency voltage, first circuit means for generating an output voltage which compensates for a change of the difference between the optical paths of the two reflected light beams in accordance with the electrical signal and the radio-frequency voltage, and adder means for adding the output voltage from the first circuit means and the radio-frequency voltage from the radio-frequency oscillator to provide the voltage signal to be applied to the optical-path regulation means; and means for measuring the change in the clearance between the two members from the output voltage of the first circuit means.

5. An apparatus for optically measuring a clearance change as defined in claim 4, wherein said beam splitter is installed in the optical path of the reflected light beams.

6. An apparatus for optically measuring a clearance change as defined in claim 4, wherein said optical element is a quarter-wave plate.

7. An apparatus for optically measuring a clearance change as defined in claim 4, wherein said electrooptical crystal member is made of lithium niobate.

8. An apparatus for optically measuring a clearance change as defined in claim 4, wherein said first circuit means includes means for calculating a product between the electric signal from said photoelectric transductance means and the radio frequency voltage, and means for removing a high frequency component from the output voltage of the calculation means, said adder means adding the output voltage of the removal means and the radio frequency voltage and applying the resulting voltage to said optical-path regulation means.

9. An apparatus for optically measuring a clearance change as defined in claim 8, wherein said radio-frequency oscillator generates each of the radio frequency voltages which correspond to $\pm\lambda/4$ in terms of the optical-path difference of the reflected light beams from the two members.

* * * * *